United States Patent
Kim

(10) Patent No.: US 8,441,478 B2
(45) Date of Patent: *May 14, 2013

(54) IMAGE RESOURCE LOADING SYSTEM AND METHOD WHICH CARRIES OUT LOADING OF OBJECT FOR RENEWAL OF GAME SCREEN

(75) Inventor: Dae Il Kim, Jeollanam-do (KR)

(73) Assignee: NHN Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,653

(22) Filed: Mar. 16, 2012

(65) Prior Publication Data

US 2012/0172125 A1 Jul. 5, 2012

Related U.S. Application Data

(63) Continuation of application No. 11/570,766, filed as application No. PCT/KR2005/001928 on Jun. 22, 2005, now Pat. No. 8,164,589.

(30) Foreign Application Priority Data

Jun. 23, 2004 (KR) .................. 10-2004-0047068

(51) Int. Cl.
G06T 15/00 (2011.01)
G06T 17/00 (2006.01)
(52) U.S. Cl.
USPC .......................................... 345/419; 345/428
(58) Field of Classification Search .................. 345/419, 345/428
See application file for complete search history.

(56) References Cited

U.S. PATENT DOCUMENTS

| 5,736,982 A | 4/1998 | Suzuki et al. |
| 5,864,342 A | 1/1999 | Kajiya et al. |
| 5,867,166 A | 2/1999 | Myhrvold et al. |

(Continued)

FOREIGN PATENT DOCUMENTS

| JP | 10-275247 | 10/1998 |
| JP | 2002-049937 | 2/2002 |

(Continued)

OTHER PUBLICATIONS

Notice of Allowance issued by the Japan Patent Office in the corresponding JP Application No. 2007-517951.

(Continued)

*Primary Examiner* — Kee M Tung
*Assistant Examiner* — Haixia Du
(74) *Attorney, Agent, or Firm* — H.C. Park & Associates, PLC

(57) ABSTRACT

Disclosed are image resource loading system and method, the system comprising a basic recording space for partitioning a game map into at least one cell and maintaining an object by unit of the cell, a loading target identification unit identifying a cell becoming a target for loading and an object associated with the cell in the basic recording space, in case that a loading event occurs, an order determination unit giving a loading order to the object associated with the cell in accordance with a predetermined determination criterion, and a processor unit loading the object by referring to the given loading order, wherein the order determination unit determines the loading order by considering the size of the object or whether the object is positioned within a predetermined range of the visual field.

11 Claims, 12 Drawing Sheets

U.S. PATENT DOCUMENTS

| | | | |
|---|---|---|---|
| 5,956,039 | A | 9/1999 | Woods |
| 5,973,699 | A | 10/1999 | Kent |
| 6,028,608 | A | 2/2000 | Jenkins |
| 6,111,582 | A | 8/2000 | Jenkins |
| 6,118,456 | A | 9/2000 | Cooper |
| 6,329,986 | B1 | 12/2001 | Cheng |
| 6,346,938 | B1 | 2/2002 | Chan et al. |
| 6,380,952 | B1 | 4/2002 | Mass et al. |
| 6,437,778 | B1 | 8/2002 | Matsui et al. |
| 6,672,961 | B1 | 1/2004 | Uzun |
| 6,854,018 | B1 * | 2/2005 | Li et al. .................... 709/240 |
| 6,983,283 | B2 | 1/2006 | Sowiral et al. |
| 6,999,079 | B2 | 2/2006 | Kida |
| 7,439,970 | B1 * | 10/2008 | Clarke ........................ 345/419 |
| 2002/0180734 | A1 | 12/2002 | Endoh et al. |

FOREIGN PATENT DOCUMENTS

| | | |
|---|---|---|
| JP | 2002-063601 | 2/2002 |
| JP | 2002-279449 | 9/2002 |
| JP | 2002-304639 | 10/2002 |

OTHER PUBLICATIONS

Non-Final Office Action issued on Nov. 18, 2009 in U.S. Appl. No. 11/570,766.
Final Office Action issued on May 24, 2010 in U.S. Appl. No. 11/570,766.
Non-Final Office Action issued on Oct. 1, 2010 in U.S. Appl. No. 11/570,766.
Final Office Action issued on Apr. 12, 2011 in U.S. Appl. No. 11/570,766.
Non-Final Office Action issued on Aug. 25, 2011 in U.S. Appl. No. 11/570,766.
Notice of Allowance issued on Dec. 14, 2011 in U.S. Appl. No. 11/570,766.
International Search Report for PCT/KR2005/001928 dated Sep. 27, 2005.

* cited by examiner

IMAGE RESOURCE LOADING SYSTEM AND METHOD WHICH CARRIES OUT LOADING OF OBJECT FOR RENEWAL OF GAME SCREEN

CROSS REFERENCE TO RELATED APPLICATION

The present application is a continuation of U.S. patent application Ser. No. 11/570,766, filed on Dec. 15, 2006, which is the National Stage of International Application No. PCT/KR2005/001928, filed on Jun. 22, 2005, and claims priority from and the benefit of Korean Patent Application No. 10-2004-0047068, filed on Jun. 23, 2004, all of which are hereby incorporated by reference for all purposes as if fully set forth herein.

TECHNICAL FIELD

The present invention relates to image resource loading method and system, and more particularly, to image resource loading system and method loading an object for updating a game screen, in which a loading order with respect to each of objects is determined by considering the size of the object, or whether the object is positioned within the predetermined range of the visual field.

BACKGROUND ART

In general image realization process, image data are loaded at a CPU (Central Processing Unit), and the loaded image data are rendered at a GPU (Graphics Processing Unit). Like above, since the GPU may render only the loaded image data, image data first loaded, first rendered.

Generally, a conventional resource loading method determines a loading order of an object on the basis of the virtual distance between a particular point and the object from image data. In case that the particular point moves, a new object necessary for rendering is loaded in order of the nearest virtual distance, on the basis of the newly computed virtual distance between the particular point and the object Even in case that a recording device records all image data with respect to objects constituting a particular virtual space, there is a case that some objects are not displayed on images rendered and generated by the GPU. Taking a game as an example, although a tree object for indicating a tree is positioned near from a location of a player character, in case that a big building object is provided between the player character and the tree object, the tree object may not be seen at all in the visual field of the player character.

In this case, the GPU does not render the tree object, unless the player character moves to the back of the building object. Thus, the tree object is not displayed on a display unit, however, since the tree object is near to the player character, the CPU "loads the tree object prior to an object that is positioned further away from the player character than the tree object, but has is to be rendered That is, according to the prior art, there is a problem that the CPU first loads an object unnecessary to be displayed to a user rather than other objects necessary to be displayed to the user, just because the virtual distance between the object and a player character is nearer than other objects.

DISCLOSURE OF INVENTION

Technical

The present invention is conceived to solve the aforementioned problems in the prior art. Thus, the present invention provides image resource loading system and method, which give a comparatively higher loading order to an object of which image is required to be first realized, thereby capable of loading and rendering the object to the optimization.

The present invention also provides image resource loading system and method, which measure the volume of an object that occupies a cell and is a target for loading and give a loading order to the object in accordance with the measured size of the volume, thereby preferentially loading an object having a more amount of data to be processed.

The present invention also provides image resource loading system and method, which determine the range of the visual field by using a visual angle at a view point, and preferentially give a comparatively higher loading order to an object positioned in the range of the visual field, thereby preferentially loading an object having a higher need of rendering.

The present invention also provides image resource loading system and method, which measure the surface area of an object exposed to the visual field of a player character, thereby preferentially loading an object having a smaller area which is occluded by another object.

Technical

In order to achieve the above goals, according to an aspect of the present invention, there is provided an image resource loading system loading an object for updating of a game screen, including: a basic recording space for partitioning a game map into at least one cell and maintaining an object by unit of the cell; a loading target identification unit identifying a cell becoming a target for loading and an object associated with the cell in the basic recording space, in case that a loading event occurs; an order determination unit giving a loading order to the object associated with the cell in accordance with a predetermined determination criterion; and a processor unit loading the object by referring to the given loading order; wherein the order determination unit determines the loading order by considering the size of the object or whether the object is positioned within a predetermined range of the visual field.

Also, according to another aspect of the present invention, there is provided an image resource loading method loading an object for updating a game screen, including the steps of: maintaining an object in a basic recording space by unit of a cell in which the cell is a zone in case that a game map is partitioned into at least one zone; identifying a cell becoming a target for loading and an object associated with the cell in the basic recording space in case that a loading event occurs; giving a loading order to the identified object in accordance with a predetermined determination criterion; and sequentially loading the object by referring to the given loading order; wherein, in the step of giving a loading order to the identified object, the loading order is given to the identified object on the basis of at least one determination criterion selected from the group consisting of the size of the identified object, whether the identified object is positioned within the range of the visual field of a player character, the screen area of the object at a view point along an eye direction of the play character, or the distance between the player character and the identified object.

BEST MODE FOR CARRYING OUT THE INVENTION

Hereinafter, image resource loading system and method will be described with reference to the accompanying drawings The term "object" continuously used in the present specification indicates data that becomes a target for realizing an image on a game map where a game service is provided. A group of data for displaying a thing, for example, a three-dimensional building or tree, may be expressed as an object. For example, a type of data included in an object includes all information that is used to specify the object and generate an image thereof, such as location information including depth information, color information, texture information, and light reflection information.

Also, the term object may be used to indicate the thing in the present specification.

For example, in the expression "load an object," the object is a group of data for generating/displaying a predetermined thing. In the expression "measure the distance between an object and a player character," the object is the thing itself. It is apparent to those of ordinary skills in the related art whether the object is used as the first or the second in the present specification.

That is, an object is data to be rendered and to offer an image to a gamer.

The term "cell" used in the present specification indicates an image area, a virtual unit partition, in which a game map is partitioned according to a predetermined condition, for example, a region and an equal area. Thus, the "cell" may be a basic unit providing all kinds of service data associated with a game progress of a player character (including an object which is realized as an image). For example, a predetermined game server supporting a game service may be connected to each of cells (or a plurality of grouped game cells). A player character positioned in a particular cell may receive all kinds of services associated with a game progress from the game server.

Figure 1:
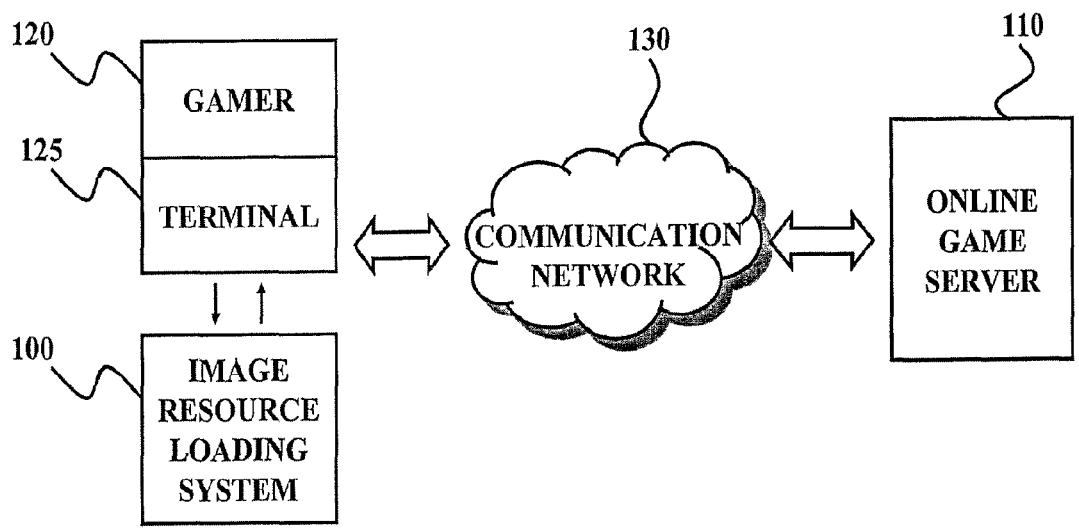
FIG. 1 is a diagram explaining the schematic operations of an image resource loading system according to the present invention.

FIG. 1 is a diagram explaining the schematic operations of an image resource loading system according to the present invention.

An image resource loading system 100 is a device for recognizing an object becoming a target for loading on a cell and giving the recognized object a loading order at a predetermined processor unit. The image resource loading system 100 first loads an object of which image realization (rendering) is preferentially required in a higher loading order, and later loads an object having a comparatively lower need of being an image in a lower loading order, thereby becomes capable of loading objects in the optimal loading order. The image resource loading system 100 may be embodied in a terminal 125 driving a RPG (Roll Playing Game) requiring a variety of image realization with respect to an object in accordance with a cell location of a player character, particularly, a MMORPG (Massively Multi-player Online Role Playing Game) in which a plurality of gamers is simultaneously playing an online game in a broadband game area. In the present embodiment, it is described as an illustrative example that the image resource loading system 100 of the present invention is embodied in an online-based RPG, but it will be apparent to those of ordinary skills in the related art that the image resource loading system 100 may be applied to all image realization fields associated with data loading for realizing an object image onto a display unit. Also, while the image resource loading system 100 may be embodied in both the inside or outside the terminal 125, it is described in the present invention that the image resource loading system 100 is installed in the inside of the terminal 125 of a gamer 120 and loads an object included in a predetermined cell. This is for convenience of description.

An online game server 110 may be a MMORPG-related game service server that is connected to the terminal 125 of the gamer 120 and a communication network 130, and serves to provide an online game service to the gamer 120. In case that the gamer 120 accesses the online game server 110 by using the terminal 125 in which a game-related program is installed, a game service in the online game server 110 may be provided through the game-related program run by game progress data or game patch transmitted to the terminal 125 from the online game server 110. Also, the online game server 110 grants a right to control of operations with respect to a predetermined player character to the gamer 120 in this game environment, and enables the gamer 120 to control the operations of the player character independently, thereby providing a full game service.

The gamer 120 may be an Internet user who has the terminal 125 to access the communication network 130, and receives a game service from the online game server 110 with which the gamer 120 is making a predetermined contract. The gamer 120 may control a player character to move to a particular cell on a broad game map. Also, the gamer 120 receives an image realized by rendering an object loaded by the image resource loading system 100 of the present invention The terminal 125 is a device that maintains a connection state with the online game server 110 and embodies an online game. That is, the terminal 125 is a general concept of terminals having computation capacity by mounting a predetermined memory unit and a micro processor, for example, a personal computer, a handheld computer, a PDA (Personal Digital Assistant), a cell phone, a smart phone, and the like.

The image resource loading system 100 determines a loading order of an object in accordance with the size of the object or whether the object is positioned within the predetermined range of the visual field, in loading the object included in a particular cell. That is, the image resource loading system 100 serves to specify an object of which image has to be preferentially realized, as a player character moves in a virtual space. Hereinafter, configuration of an image resource loading system 200 of the present invention will be in detail described with reference to FIG. 2.

Figure 2:
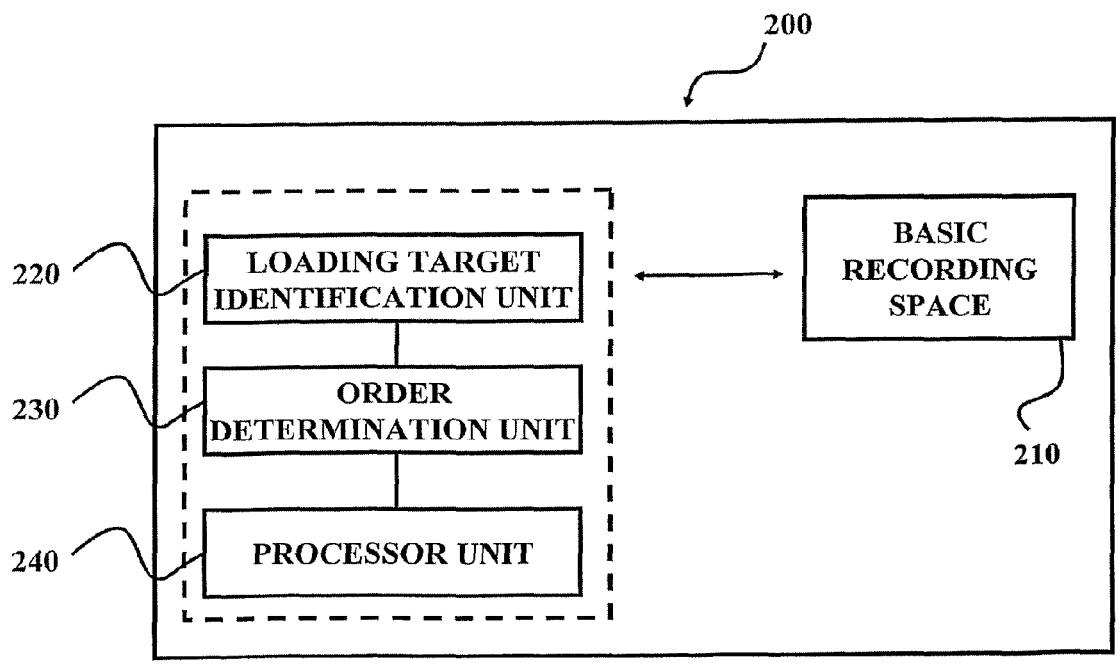
FIG. 2 is a configuration diagram illustrating an image resource loading system according to an exemplary embodiment of the present invention.

FIG. 2 is a configuration diagram illustrating an image resource loading system according to an exemplary embodiment of the present invention.

The image resource loading system 200 according to the present invention includes a basic recording space 210, a loading target identification unit 220, an order determination unit 230, and a processor unit 240.

The basic recording space 210 is a logical or physical unit for partitioning a game map, that is, a virtual space, into at least one cell and maintaining an object by unit of the cell. That is, the basic recording space 210 partitions the entire game map where a game service is provided into at least one cell in accordance with a predetermined condition, for example, each game stage (region), an equal area, a signal processing ratio, and the like. Also, the basic recording space 210 enables an object included in a particular cell to be classified and recorded in correspondence to the cell. Thus, the image resource loading system 200 may enable the basic recording space 210 to recognize an object becoming a target for loading rapidly and precisely in correspondence to a cell where a predetermined loading event occurs. An object as aforementioned is a fixed thing of which image is realized in a corresponding cell. The basic recording space 210 may include information on the number of polygons constituting an object, realization coordinates, color information on the object, or texture information, with respect to each object. Such information is used to render the object and generate an image thereof The loading target identification unit 220 is a unit for identifying a cell becoming a target for loading and an object associated with the cell in the basic recording space 210, in case that a loading event occurs. At this time, the loading event may occur as a player character which progresses a game moves its location. That is, in case that a player character positioned in a particular cell approaches a neighboring cell within the particular distance, the loading event may occur in association with the neighboring cell. Thus, it is possible to reduce or eliminate a standby time until the gamer 120 receives an image at an entered cell, by loading an image source with respect to the cell before the gamer 120 enters a predetermined cell.

The loading target identification unit 220 identifies an object stored in correspondence to a cell where a loading event has occurred, as a target for loading. According to embodiments, the loading target identification unit 220 may identify all objects corresponding to the cell to be targets for loading, or may identify objects excluding some objects satisfying a predetermined condition (a condition such that a system maintains loading data about an object of a corresponding cell, such as history about previous loading) to be targets for loading The order determination unit 230 is a unit for giving a loading order to an object associated with a cell, in accordance with a predetermined determination criterion. That is, the order determination unit 230 serves to determine in which order to load the objects identified as targets for loading as above. In the present embodiment, the order determination unit 230 determines a loading order by considering the size of an object occupying a corresponding cell or whether the object is positioned within the range of the visual field. Hereinafter, the operations of the order determination unit 230 will be described with reference to FIGS. 3 to 7.

Figure 3:
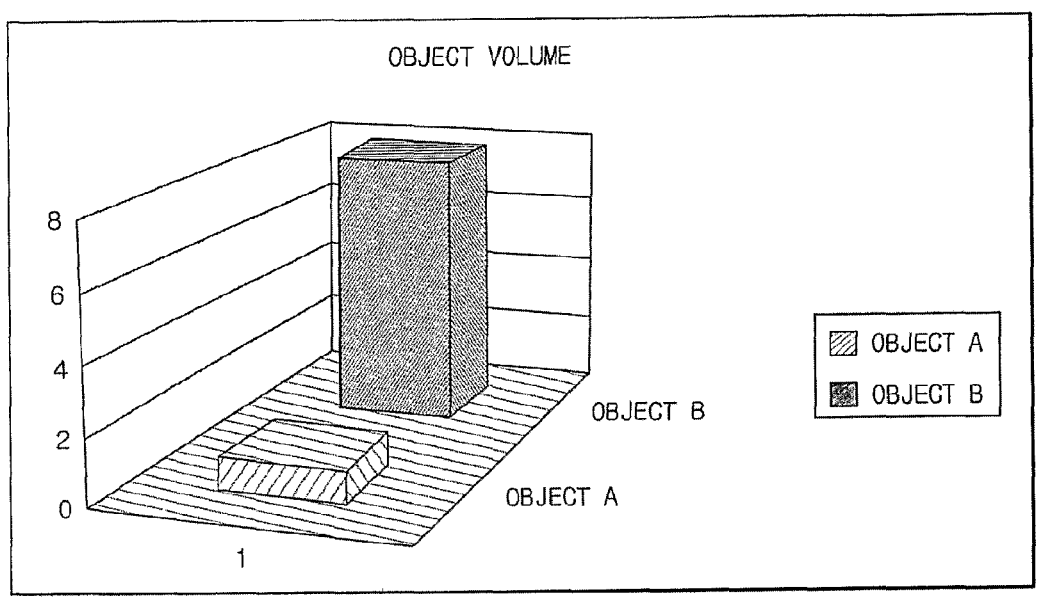
FIG. 3 is a diagram explaining about controlling a loading order to be determined in accordance with the size of an object.

FIG. 3 is a diagram explaining about controlling a loading order to be determined in accordance with the size of an object.

As illustrated in FIG. 3, the order determination unit 230 measures the volume of an object occupying a cell to be a factor of determining a loading order, and gives a loading order in accordance with the size of the measured volume. That is, the order determination unit 230 lets a loading order of an object having the comparatively smaller volume than the volume of another object, be a latter loading order. In interoperation therewith, image realization (rendering) of the object is postponed to be completed in latter order. This is such that an object having the larger volume is first loaded and first rendered in a cell where a play character is positioned.

In a conventional loading method, an object is loaded only based on the distance. Thus, there is a problem that loading is unstable and a loading time is delayed in case that there suddenly occurs a request for loading an object having a large amount of loading data in accordance with a movement of a player character. However, according to the preset embodiment, the above problem may be solved. Also, according to the conventional loading method, since a big building is loaded, rendered and displayed later than a small building, the gamer 120 goes through a sudden conversion of screen. That is, it is unnatural if the gamer 120 enters a particular cell and a big building later appears in a certain time. However, according to the present embodiment, since a big building is first loaded/rendered/displayed and a small building is later loaded/rendered/displayed, there is a little change of an image and a more natural image is provided to the gamer 120

That is, the order determination unit 230 determines such that a loading order is preferentially given to an object having a comparatively larger amount of data to be rendered from objects in accordance with a movement of a player character. Thus, an amount of rendering at a processor unit, for example, a GPU, is not fluctuating and an image of the object may be realized stably.

Figure 4:
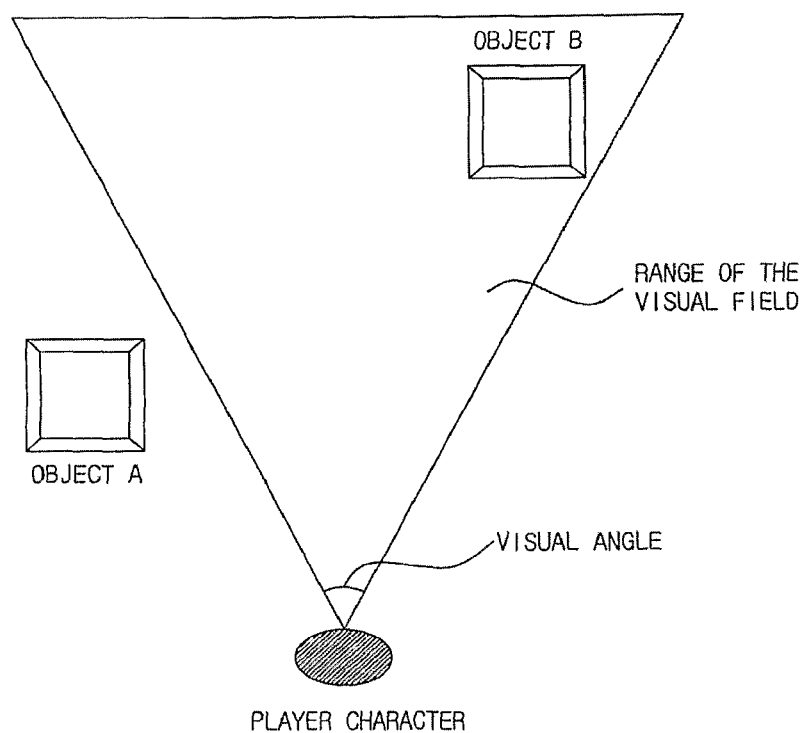
FIG. 4 is a view explaining about controlling a loading order to be determined in accordance with a location of an object in the range of the visual field according to the present invention.

FIG. 4 is a diagram explaining about controlling a loading order to be determined in accordance with a location of an object in the range of the visual field according to the present invention.

As illustrated in FIG. 4, the order determination unit 230 determines the range of the visual field that is formed using a visual angle at a predetermined view point, and determines whether an object is positioned within the determined range of the visual field. A view point in the present embodiment is determined, for example, on the basis of a location point of a player character progression a game. The visual angle and the visual field formed based thereon are set up to be a predetermined three-dimensional area based on a direction (or an eye direction) that a player character progresses. That is, the order determination unit 230 determines a cell area that a player character can visually recognize to be the range of the visual field.

According to an embodiment of the present invention, the visual angle may be determined on the basis of information about the faculty of sight (for example, a visual angle) of the player character, based on a movement direction thereof and the view point. Information about the faculty of sight is a recognition ability about a game map granted to each of player characters. The information about the faculty of sight may be updated differentially in accordance with particularity of a species of a character or improvement of a power value thereof, and recorded in a predetermined character information database. Also, according to another embodiment of the present invention, a loading order is determined by determining the first range of the visual field, in which a visual angle is identical irrespective of information about the faculty of sight of a player character. An image may be generated in the second range of the visual field which is determined in accordance with information about the faculty of sight of each character while rendering. That is, the first range of the visual field used in the step of loading and the second range of the visual field used in the step of rendering may be independently determined Also, the order determination unit 230 determines an object included in the range of the visual field from the identified objects like above, and may control a comparatively higher loading order to be given to the object positioned within the range of the visual field. This is in order to load an object that has to be preferentially provided to the gamer 120 operating a player character prior to other objects. FIG. 4 is a view illustrating the range of the visual field of a player character cut in parallel with a cell plane. In FIG. 4, object A positioned outside the range of the visual field of the game character is not necessary to be realized prior to object B positioned within the range of the visual field. Thus, a latter loading order is given to the object A. If a movement direction of the game character changes and thereby, the object A is positioned in the range of the game character, the order determination unit 230 may control a loading order of the object A to go up.

Figure 5:
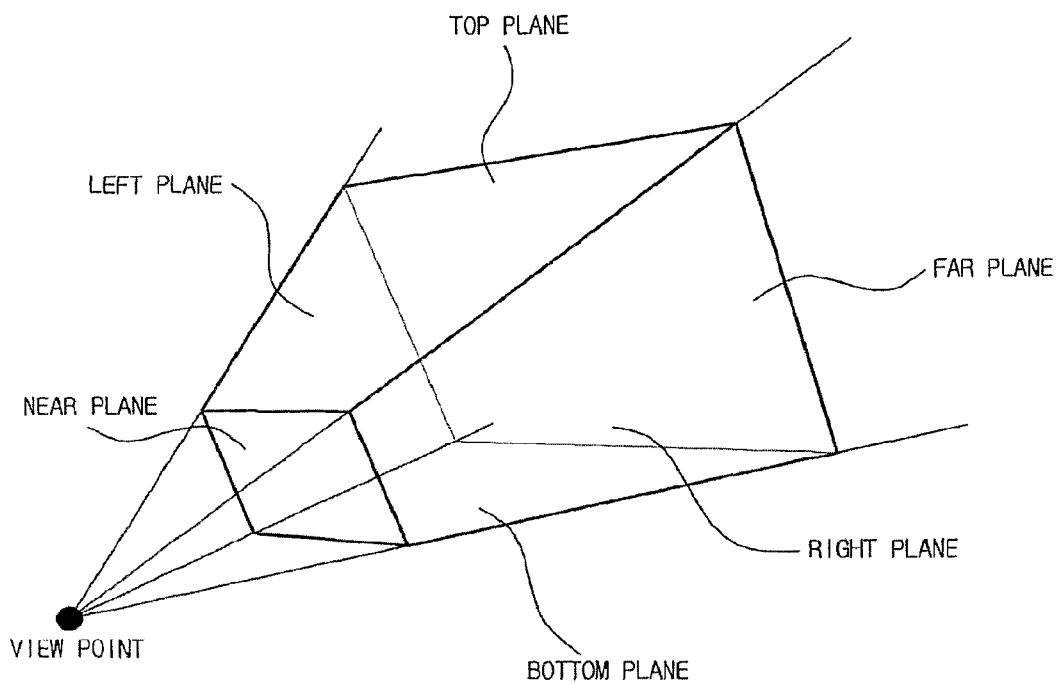
FIG. 5 is a view explaining about a view frustum determining the range of the visual field in the present invention

Hereinafter, a process that the order determination unit 230 determines whether a predetermined object belongs to the range of the visual field will be further in detail described. The range of the visual field may be determined to be a view frustum. At this time, the view frustum is a geometrical area defining a position that has to be displayed to the gamer 120 among a three-dimensional space. For example, the view frustum may be a finite area in which a three-dimensional pyramid having a view point as its apex is cut by a near plane that is near from a visual point and a far plane that is far therefrom. FIG. 5 is a view illustrating an example of the view frustum.

Accordingly, from objects included in a cell becoming the target for loading, a loading order is preferentially given to an object positioned within the view frustum (included in the view frustum), and the object is first loaded.

As one method of determining whether an object is included in a view frustum, for example, Bounding Volume Hierarchies (BVH) may be used. The bounding volume (BV) is the volume including a group of objects, and all sorts of computation may be completed rapidly by inspecting the bounding volume prior to check of an object itself. That is, the order determination unit 230 performs a check of the bounding volume before check of an object itself, thereby capable of omitting a check with respect to an object included in the bounding volume not corresponding (or corresponding) to a predetermined condition.

The BVH may be the most general space data structure for real-time rendering of a three-dimensional scene. An object within a particular area is constructed to be a hierarchical tree by using the BVH. The object may be composed of 1) a route node not having a parent node as the highest node, 2) a leaf node having an actual object, and 3) an internal node having a point with respect to a child node.

The order determination unit 230 checks whether each node of the bounding volume (BV) and the view frustum cross by doing a preorder traversal from the route node. As a result of the check, if the bounding volume (BV) and the view frustum cross, the order determination unit 230 continues to do a traversal and check the child nodes. If a leaf node is crossing, the order determination unit 230 grants priority of a loading order to an object of the leaf node.

Of course, in case that a leaf node is crossing, it is not guaranteed that an object included in the leaf node is all included in the view frustum. Also, it is possible that a portion of the object may be included in the view frustum. Thus, according to another embodiment of the present invention, in case that a leaf node is crossing, the order determination unit 230 may further use a clipping function, such that a loading order is preferentially given only to an object positioned within the view frustum from objects included in the leaf node. For example, the order determination unit 230 may perform clipping of an object with respect to a top plane, a bottom plane, a left plane, and a right plane of the view frustum, using the clipping function.

In case that the predetermined bounding volume (BV) is completely included in the view frustum, it is of course that an object included in the bounding volume is also completely included in the view frustum. Thus, priority is granted to the object included in the bounding volume, with respect to a loading order.

In the meantime, in case that the predetermined bounding volume (BV) exists outside the view frustum, an object included in the bounding volume exists all outside the view frustum. Thus, priority is not granted to the object, with respect to a loading order Through the configuration such above, the order determination unit 230 may determine whether a predetermined object is positioned within the range of the visual field that is determined on the basis of a view point and a movement direction of a player character. Also, the order determination unit 230 may preferentially give a loading order to an object positioned within the range of the visual field of a player character to be first loaded.

Figure 6:
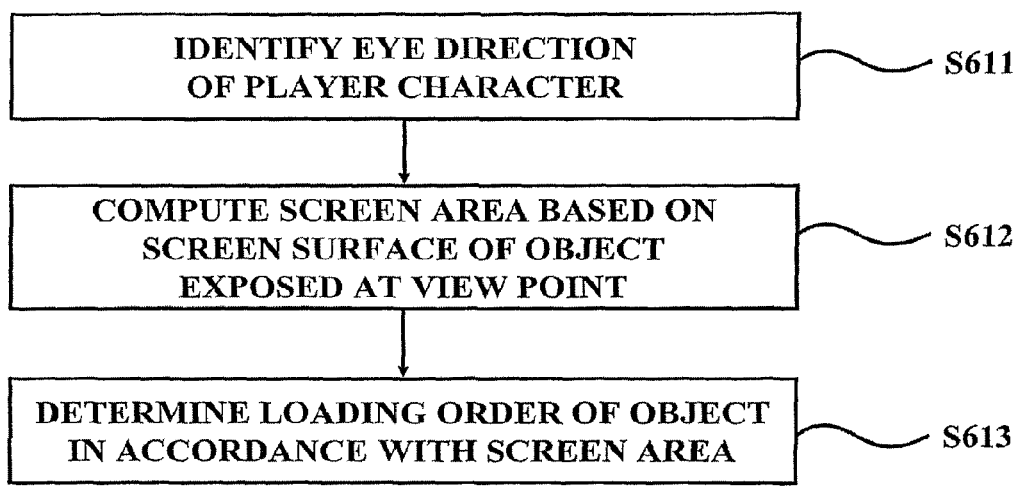
FIGS. 6 and 7 are diagrams explaining about controlling a loading order to be determined in accordance with an area occluded between objects.
Figure 7:
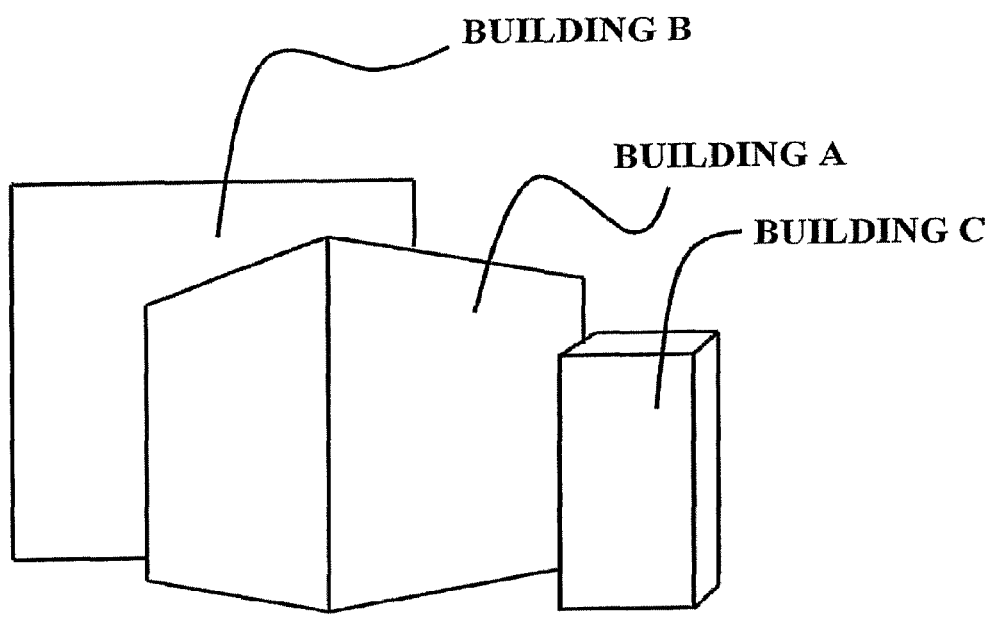

Meanwhile, FIGS. 6 and 7 are diagrams explaining about controlling a loading order to be determined in accordance with an area occluded between objects.

As illustrated in FIG. 6, in step S611, the order determination unit 230 identifies an eye direction of a player character at a view point where the player character is positioned. This step S611 is a procedure for identifying an eye direction of the player character that is changeable in accordance with a movement of the player character on a game map/cell. In this step S611, an object that the player character watches, that is, an object of which image is necessary to be realized, is identified on the basis of an eye direction of the player character.

In step S612, the order determination unit 230 measures the surface area of the object that is exposed at the view point along the eye direction, thereby computing a screen area that is not occluded by another object from the measured surface area. That is, the term 'screen area' used in the present specification is the surface area of an object exposed to the visual field of a user. The screen area is variable with respect to the same object. That is, the screen area of an object that is away from a location of a player character is computed to be small, and in case that another object is provided between the object and the player character, thereby hiding a large portion of the object, the screen area of the object is also computed to be small.

Meanwhile, according to another embodiment of the present invention, the order determination unit 230 may first identify an object belonging to the determined range of the visual field such above and later compute the screen area with respect to objects belonging to the range of the visual field. A screen area is an area where a particular object is exposed to a player character, and in case that the object is positioned outside the range of the visual field of the player character, it can be said that the screen area is '0' at any time. Thus, the order determination unit 230 does not need to individually compute a screen area of an object positioned outside the range of the visual field, determines the screen area to be '0', and does not give a preferential loading order to the object.

In case that an object positioned comparatively far away is occluded by an object near to a player character in an aspect of the distance, a screen area may be an external area that is not occluded by the object near to the player character from the surface area of the object positioned far away. In the step S612, the order determination unit 230 computes the screen area of each object.

In FIG. 7, there are illustrated buildings A, B, and C, positioned within the range of the visual field of a player character. The order determination unit 230 computes screen areas of the building A to C, and it is assumed that the screen areas are computed in order of the building A, the building B, and the building C.

The order determination unit 230 gives a loading order to each of objects, in accordance with each computed screen area. Thus, loading orders are given in order of the building A object, the building B object, and the building C object.

While the building B is larger than the building A, only a portion of the building B is shown to a player character since it is occluded by the building A. Thus, in case that the building B is first generated and displayed to the gamer 120, and the building A is later generated and displayed to the gamer 120, there occurs a sudden change, and the gamer 120 receives a unnatural game screen image. Thus, it is preferable to render the building A first. Accordingly, the order determination unit 230 gives a loading order such that the building A object necessary to be first rendered should be loaded prior to the building B object Also, while the building A is further away from a player character in comparison with the building C, the screen area of the building A is larger than that of the building C. Thus, according to the prior art, objects are loaded in order of the building C, the building A, and the building B, that is, in order of the distance. However, according to the present embodiment, objects are loaded in order of the building A, the building B, and the building C, that is, in order of a large screen area. Thus, the image resource loading system 200 according to the present embodiment may reduce a sudden change of an image to be displayed, thereby providing a natural image to the gamer 120 since objects are loaded/rendered/displayed in order to be 'well seen' to the gamer 120. Also, rendering may be efficiently performed in an aspect that image data to be used first is first loaded.

Also, according to another embodiment of the present invention, the order determination unit 230 may preferentially give a loading order to an object that is not hidden (occluded) by another object from objects positioned within the range of the visual field While the screen area of each object exposed to a player character is computed and a loading order is given on the basis of the computed screen area in the aforementioned embodiment, in the present embodiment, a loading order is given by determining only whether an object is "occluded or not" without computing the screen area of the object. Thus, in a loading order determination method according to the present embodiment, an amount of computation at the image resource loading system 200 is not much because it is unnecessary to compute the screen area for each object. Also, since it should be determined whether an object is occluded for rendering anyway, although whether an object is occluded is determined ahead in a loading process, but new computation processes are not generated much in the loading order determination method according to the present embodiment.

Also, according to embodiments, a loading order may be given by determining whether the object is "completely occluded, partly occluded, or not occluded at all That is, according to embodiments, a loading order may be given by a variety of methods. For example, the order determination unit 230 may give priority to objects, in order of a first object that is not occluded by other objects, a second object that is partly occluded by other objects, and a third object that is completely occluded by other objects. Also, the order determination unit 230 may give the same priority to the first and the second objects and may not give priority to the third object. Or, the order determination unit 230 may give priority only to the first object, but may not give priority to the second and the third objects. Hereinafter, a concrete method of determining whether a predetermined object is occluded by other objects will be described by taking some example.

The Z-buffer algorithm (depth buffer algorithm) may be used as the simplest method. The Z-buffer has the same size and shape to a color buffer, and each of pixels stores a depth value from a view point to the currently nearest geometric element. Thus, if a z-value of a predetermined object is smaller than a value stored in the Z-buffer, the object is determined to be nearer to the view point. That is, the object corresponds to an object that is not occluded.

However, while a hiding (occlusion) check may be performed simply by using the Z-buffer algorithm, it cannot be said that the Z-buffer algorithm is good at computation. For example, in case that depth complexity is very high, such as a case of looking at 10 spheres arranged in a row along an arranged direction, one sphere is seen while other nine spheres hidden. Nevertheless, since z-values of the ten spheres should be all compared, an amount of computation may be huge.

Accordingly, a plurality of algorithms that can perform a more efficient hide check is well known. For example, algorithms, such as occlusion horizon, shaft occlusion culling, hardware occlusion query, hierarchical Z-buffering, and the HOM (Hierarchical Occlusion Map) algorithm, may be selected Thus, according to the present invention, it is possible to determine which object is occluded by other objects and which object is not from objects included in a cell, and to give a preferential loading order to the object not occluded, to be first loaded.

Figure 8:
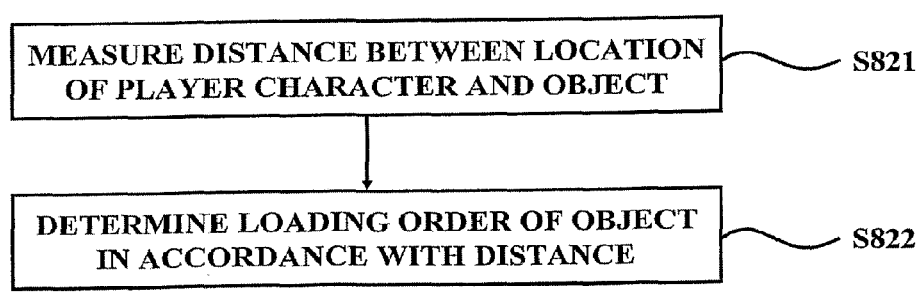
FIG. 8 is a view explaining about controlling a loading order to be determined in accordance with the distance between an object and a player character.

Also, according to another embodiment of the present invention, the order determination unit 230 may determine a loading order by considering the distance between a player character and an object. FIG. 8 is a view explaining about controlling a loading order to be determined in accordance with the distance between an object and a player character according to the present invention.

In step S821, the order determination unit 230 measures the distance between an identified object and a location of a player character on a game map. This step S821 is a procedure for measuring the distance between a player character and an object on a cell where the play character is positioned or approaching while a game in progress.

In step S822, the order determination unit 230 gives a loading order to an object in accordance with the measured distance. This step S822 is a procedure for giving a higher loading order to an object that is comparatively nearer to a point where a player character is positioned on a game map. In this step S822, a higher loading order is given to an object of which image is necessary to be preferentially realized to the gamer 120

Figure 9:
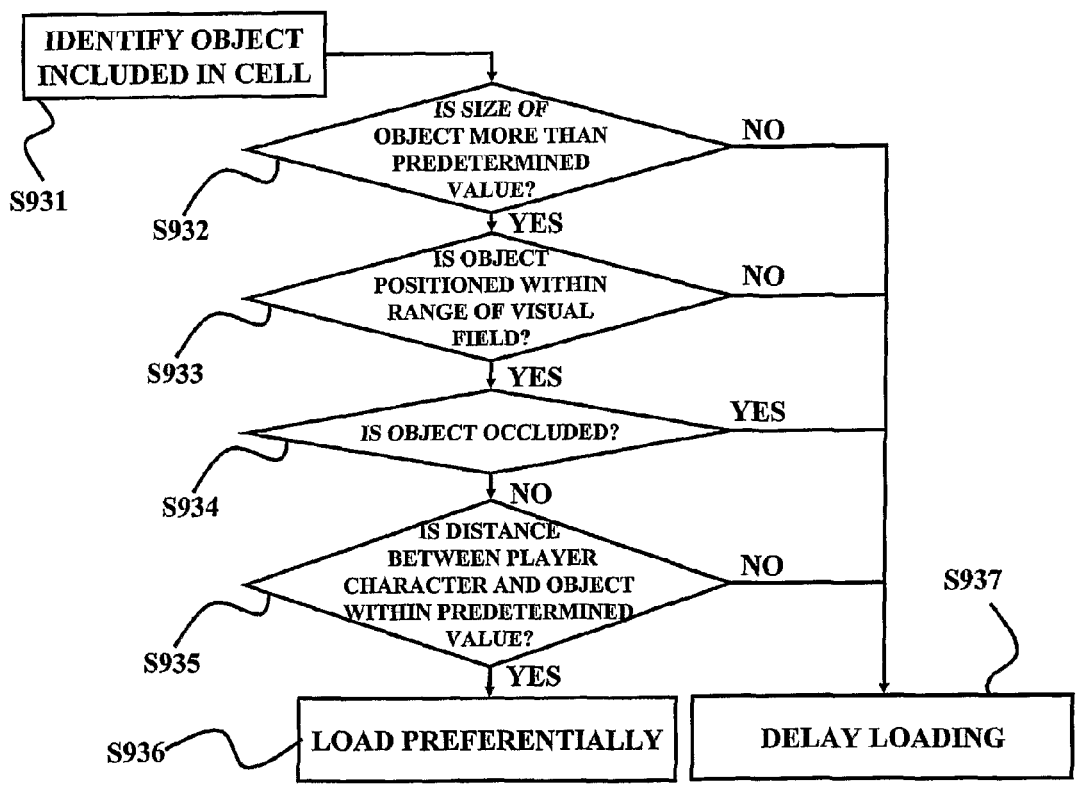
FIG. 9 is a flowchart illustrating the procedure of giving a loading order according to each of determination criteria, in another embodiment of the present invention.

The procedures of giving a loading order to each of objects included in the cell in accordance with each determination criterion have been described. The present invention does not load objects included in a cell in random order, but, instead, enables a comparatively higher loading order to be given to an object of which image is necessary to be first realized, thereby inducing the optimal loading and rendering, by considering whether an object is positioned within the range of the visual field of a player character, the occlusion area/the size of an object, whether an object is occluded, and the distance between an object and a player character In the present embodiment, the order determination unit 230 may adopt at least one of various determination criteria as described above (the size of an object, whether an object is positioned within the range of the visual field, the screen area of an object, the distance between a player character and an object, etc.) to determine a loading order, and adopt the determination criteria sequentially to determine a loading order of the object. Determination procedures according to the present embodiment will be described with reference to FIG. 9.

In step S931, the loading target identification unit 220 identifies a cell becoming a target for loading and identifies an object included in the cell. In step S932, the order determination unit 230 delays loading of the identified object in case that the size of the identified object is less than a predetermined value, that is, gives a latter loading order.

In the same manner, in steps S933 to S935, the order determination unit 230 determines whether to load the identified object in accordance with each determination criterion, that is, whether to preferentially give a loading order in step S936, or whether to delay loading of the identified object, that is, to give a latter loading order in step S937. According to the present embodiment, the order determination unit 230 may enable an object that is not occluded by other objects and near to a player character to be first loaded from objects having the predetermined size.

Also, according to another embodiment of the present invention, the order determination unit 230 gives a predetermined evaluation point to a determination result based on each determination criterion and adds up each evaluation point to determine a loading order of an object. For example, evaluation point 0 is given when an object is occluded and evaluation point 1 is given when not occluded.

Also, according to another embodiment of the present invention, the order determination unit 230 gives weight to an evaluation point according to the determination result and adds up to determine a loading order of an object. That is, an order determination method using weight enables the order determination unit 230 to give a loading order by considering all related determination criteria. Thus, it is possible to prevent a loading order from being remarkably lower since an evaluation point by a particular evaluation criterion is low. Also, it is possible to give importance to a particular evaluation criterion. For example, a loading order may be preferentially given to a big object by giving high weight to an evaluation point based on the size of the object, although the object is positioned a little far away In case that a loading order of each of objects included in the cell is given and each object is loaded according to the configuration as described above, rendering of a video processor unit is flexibly controlled within the stabilized scope by first loading an object of which image is preferentially necessary to be first rendered and realized. Also, it is possible to provide the gamer 120 with a naturally changing image.

Referring to FIG. 2 again, the processor unit 240 is a unit for loading an object by referring to a loading order given by the order determination unit 230. That is, the processor unit 240 serves to sequentially load objects, targets for loading, in order of loading order. For example, the processor unit 240 accumulates objects loaded in a predetermined graphic memory unit (not illustrated) waiting for image realization (rendering) by a video processor unit. The loading order of each object is determined differentially, and the processor unit 240 compares the loading order between objects and preferentially loads an object having a comparatively higher loading order. Accordingly, there is an effect that stable rendering is completed by loading an object requiring preferential image realization in higher loading order.

Meanwhile, according to another embodiment of the present invention, the image resource loading system 200 receives updated image resource data from the online game server 110 in real time, in case that a predetermined image resource data updating requirement occurs.

Taking a MMORPG (Massively Multi-player Online Role Playing Game) as an example, in case that player character A destroys a building and modifies a shape of the building, the online game server 110 transmits the modification information to a terminal of a gamer accessing the same map with the player character A. The modification information includes information notifying that the shape of the object has been modified and information for displaying the modified shape of the object.

Each terminal receiving the modification information updates an object associated with the building recorded in the basic recording space 210 in accordance with the received modification information and records, thereby enabling the shape of destroyed building to be displayed to all the users accessing the map.

As one element enabling real-time image updating in a plurality of terminals accessing the online game server 110, there may be optimization of loading/rendering according to optimization of a loading order of an object as described above.

Hereinafter, in another embodiment of the present invention, operation flows of the image resource loading system 200 will be in detail described.

Figure 10:
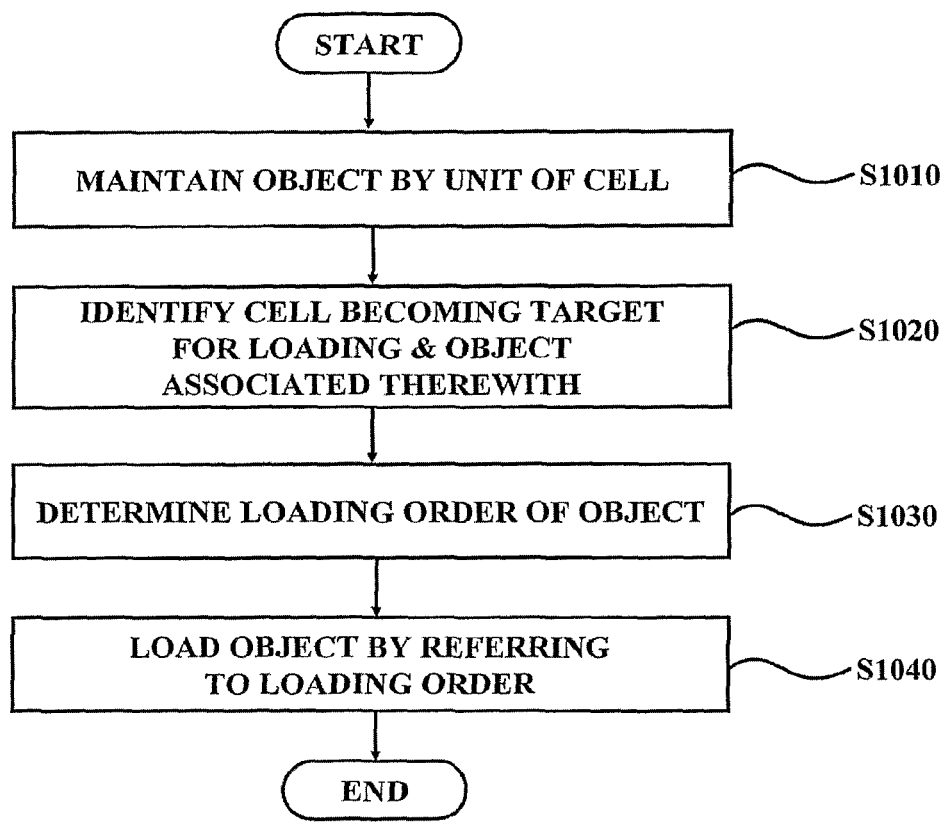
FIG. 10 is a flowchart concretely illustrating an image resource loading method according to an exemplary embodiment of the present invention.

FIG. 10 is a flowchart concretely illustrating an image resource loading method according to an exemplary embodiment of the present invention.

The image resource loading method according to the present invention is performed by the aforementioned image resource loading system 200.

In step S1010, the image resource loading system 200 maintains an object in the basic recording space 210 by unit of a cell. This step S1010 is a procedure for partitioning the entire game map into at least one cell and making an object included in each cell, a target for loading, correspond to a corresponding cell and storing the object in the basic recording space 210. As described above, at least one cell may be generated by partitioning the entire game map in accordance with a predetermined condition (for example, a region, an equal space, etc.). Also, the cell may be a basic unit enabling a game service to be provided to the gamer 120 of a player character positioned in a particular cell by a predetermined game server associated with the cell.

Also, in step S1020, the image resource loading system 200 identifies a cell becoming a target for loading and an object associated with the cell in the basic recording space 210 in case that a loading event occurs. This step S1020 is, in response to the loading event occurring at a time point when a player character moves among cells or when a change of a cell is estimated in the certain future, a procedure for recognizing an object becoming a target for loading in a cell where a loading event has occurred. Hereinafter, occurrence of a loading event will be described with reference to FIG. 11.

Figure 11:
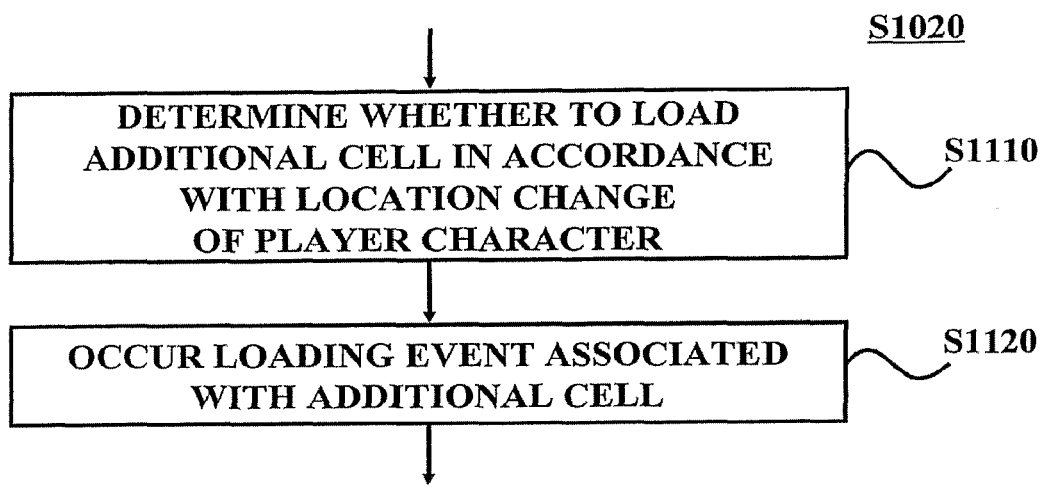
FIG. 11 is a flowchart illustrating an example of a method generating a loading event in accordance with a change of a cell of a player character, according to the present invention.

FIG. 11 is a flowchart illustrating an example of a method generating a loading event in accordance with a change of a cell of a player character, according to the present invention.

In step S1110, the image resource loading system 200 determines whether to load an additional cell on the basis of a changed location, in case that a location of a player character is changed on a game map. In this step S1110, in case that a player character is passing through the boundary between set-up cells by considering a movement direction of the player character or in case that it is estimated that the player character will be passing therethrough soon by considering a movement speed of the player character, it is determined whether loading of an object in a cell to be changed is required, Also, in step S1120, the image resource loading system 200 occurs a loading event associated with a location change of the player character, in case that it is determined that loading of an additional cell is required. This step S1120 is a procedure for generating a loading event such that loading of a newly required object is enabled in accordance with a change of a cell where the player character is positioned. After this, the image resource loading system 200 identifies an object becoming a target for loading in a changed cell, in response to the generated loading event, and sequentially performs a loading process based on a loading order of the identified object.

Referring again to FIG. 10, in step S1030, the image resource loading system 200 gives a loading order to an identified object in accordance with a predetermined determination criterion. This step S1030 is a procedure for determining a loading order of an object by considering the size of the object, or whether the object is positioned within the range of a predetermined visual field, so as to determine an object to be preferentially loaded in interoperation with an order of rendering. That is, in this step S1030, the image resource loading system 200 gives a loading order to the identified object by considering at least one determination criterion selected from the group consisting of the size of the identified object, whether the identified object is positioned within the range of the visual field of a player character, the screen area of the identified object at a view point along an eye direction of the player character, whether the object is occluded at the view point of the player character and the distance between the player character and the identified object. Hereinafter, determination of a loading order will be described with reference to FIGS. 12 to 14.

Figure 12:
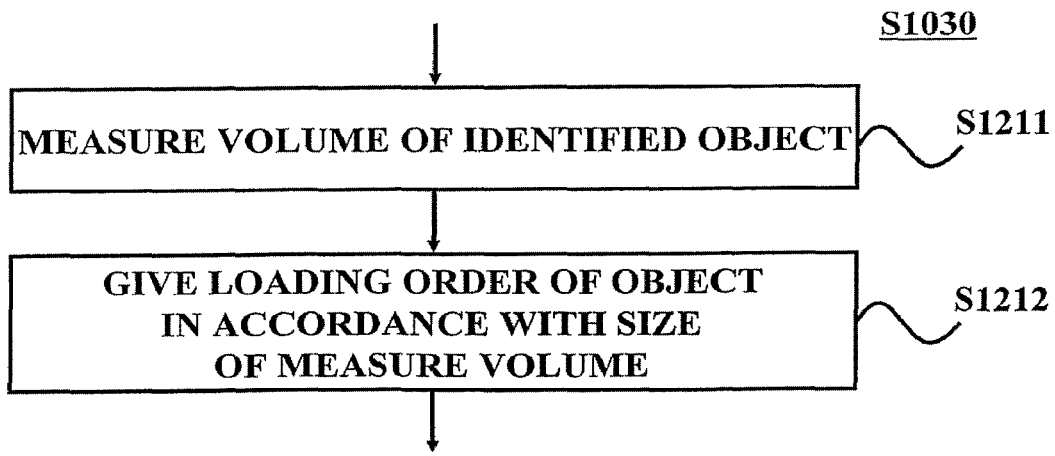
FIG. 12 is a flowchart illustrating an example of a method determining a loading order in accordance with the size of an object according to the present invention.

FIG. 12 is a flowchart illustrating an example of a method determining a loading order in accordance with the size of an object according to the present invention.

In step S1211, the image resource loading system 200 measures the volume of an identified object. This step S1211 is a procedure for computing the volume of a particular object occupying a cell. In this step S1211, the size of data to be processed for loading of an object is measured. The volume of an object is measured, for example, by counting the total number of polygons constituting the object and computing the unit volume of a polygon and the total number of the counted polygons.

Figure 13:
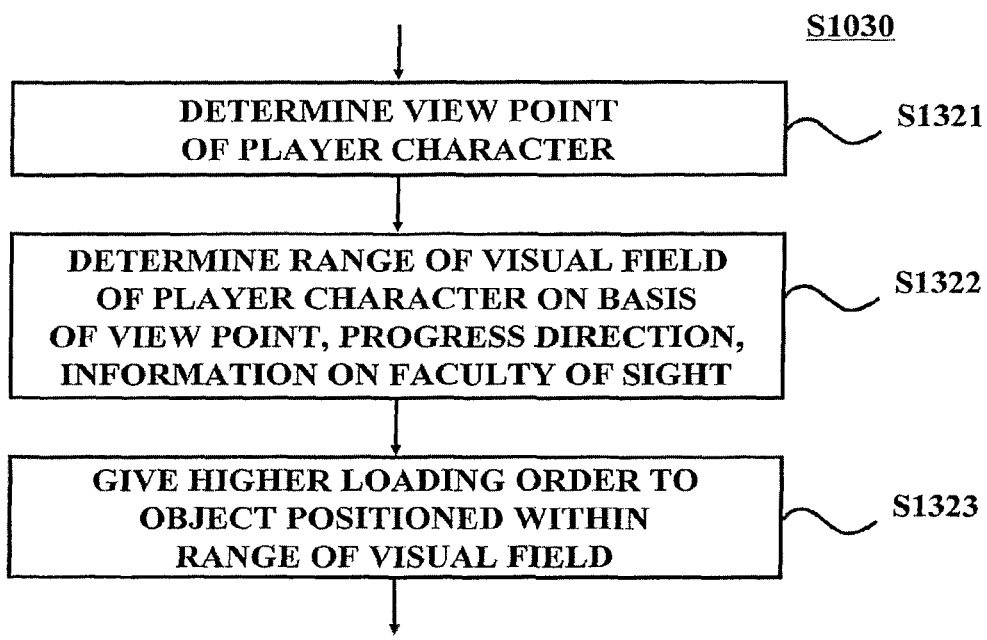
FIG. 13 is a flowchart illustrating an example of a method determining a loading order in accordance with whether an object is positioned in the range of the visual field.

Also, in step S1212, the image resource loading system 200 gives a loading order to the identified object in accordance with the size of the measured volume. This step S1212 is a procedure for measuring the volume of an object occupying a cell as a factor of determining a loading order thereof and giving a loading order in accordance with the size of the measured volume. That is, the image resource loading system 200 determines an object having the smaller volume to have a latter loading order. In interoperation therewith, image realization of the object is also delayed in the latter order FIG. 13 is a flowchart illustrating an example of a method determining a loading order in accordance with whether an object is positioned in the range of the visual field according to the present invention.

In step S1321, the image resource loading system 200 determines a view point of a player character on the basis of a location of the player character on a game map. This step S1321 is a procedure for specifying a spot where a player character is currently positioned on a cell and determining a virtual line where eyes of the player character are formed as a view point.

Also, in step S1322, the image resource loading system 200 determines the range of the visual field of the player character, on the basis of a movement direction of the player character, the view point, and information about the faculty of sight of the player character. In step S1323, the image resource loading system 200 preferentially gives a loading order to an object that is positioned within the range of the visual field from the identified objects. This step S1323 is a procedure for preferentially giving a loading order to an object positioned within the range of the visual field from objects included in a cell. Particularly, in this step S1323, the image resource loading system 200 identifies an object positioned within the determined range of the visual field, and through this, determines a loading order such that a loading order of an object positioned within the range of the visual field is different from that of an object positioned outside the range of the visual field. A concrete determination process about whether an object is positioned within the range of the visual field has been described in the aforementioned embodiment, and thus, detailed description related thereto will be omitted here.

Figure 14:
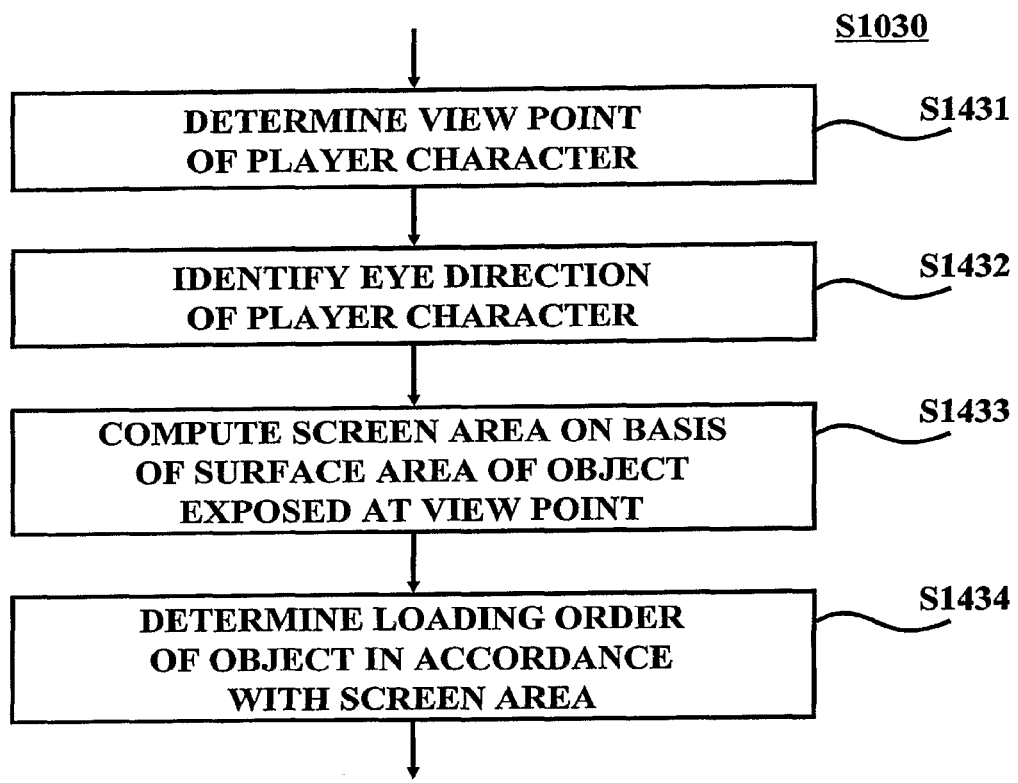
FIG. 14 is a flowchart illustrating an example of a method determining a loading order in accordance with the exposure area of an object.

FIG. 14 is a flowchart illustrating an example of a method determining a loading order in accordance with the exposure area of an object according to the present invention. In step S1431, the image resource loading system 200 determines a view point of a player character on the basis of a location of the player character on a game map. In step S1432, the image resource loading system 200 determines an eye direction of the player character at the view point. These steps S1431 and S1432 are procedures for determining an eye of the player character based on a cell point where the player character is positioned and identifying an eye direction of the payer character that is variable in accordance with a movement thereof in a game map/cell, that is, a direction that the player character currently looks at Also, in step S1433, the image resource loading system 200 computes a screen area of the identified object that is exposed at the view point on the basis of the eye direction. In step S1434, the image resource loading system 200 gives a loading order to the identified object in accordance with the screen area. These steps 1433 and S1434 are procedures for computing a screen area of each object positioned at the eye direction of the player character and determining a loading order in order of the size of the screen area.

Also, the image resource loading system 200 may determine whether an object is occluded and load a not-occluded object prior to an occluded object, instead of computing the screen area of the object. A process of determining whether an object is occluded has been concretely described in the aforementioned embodiment. Thus, description related thereto will be omitted in the present embodiment Referring again to FIG. 10, in step S1040, the image resource loading system 200 sequentially loads objects by referring to given loading orders. This step S1040 is a procedure for loading an object positioned in a cell, becoming a target for loading, in a predetermined memory unit (a recording area waiting for rendering) in accordance with the determined loading order.

Accordingly, according to the present invention, by sequentially processing loading of objects by considering a priority order to provide an image to the gamer 120 of a player character, it is possible to distribute data to be loaded and perform stable loading and rendering to the optimization.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 15:
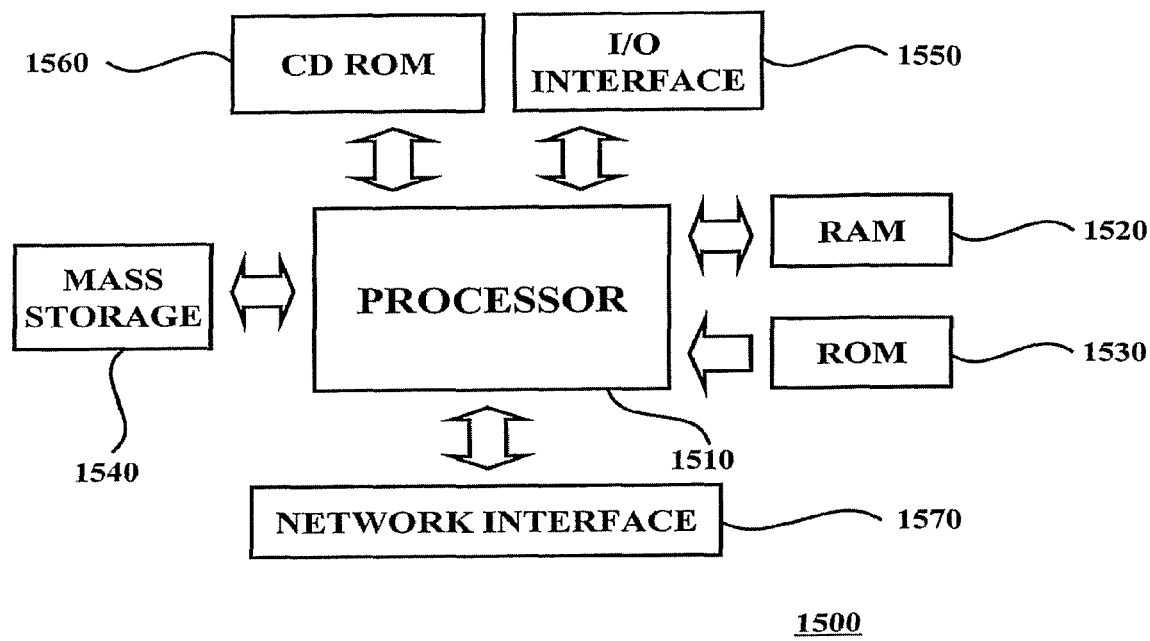
FIG. 15 is an internal block diagram of a general-purpose computer which can be employed in implementing the image resource loading method according to the present invention.

FIG. 15 is an internal block diagram of a general-purpose computer which can be employed in implementing the image resource loading method according to the present invention.

A computer apparatus 1500 includes at least one processor 1510 connected to a main memory device including a RAM (Random Access Memory) 1520 and a ROM (Read Only Memory) 1530. The processor 1510 is also called as a central processing unit CPU. As well-known to the field of the art, the ROM 1530 unidirectionally transmits data and instructions to the CPU, and the RAM 1520 is generally used for bidirectionally transmitting data and instructions. The RAM 1520 and the ROM 1530 may include a certain proper form of a computer readable recording medium. A mass storage device 1540 is bidirectionally connected to the processor 1510 to provide additional data storage capacity and may be one of the computer readable recording medium. The mass storage device 1540 is used for storing programs and data and is an auxiliary memory. A particular mass storage device such as a CD ROM 1560 may be used. The processor 1510 is connected to at least one input/output interface 1550 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 1510 may be connected to a wired or wireless communication network via a network interface 1570. The procedure of the described method can be performed via the network connection. The described devices and tools are well-known to those skilled in the art of computer hardware and software.

The described hardware devices may be formed to be operated by at least one software module in order to perform the operations of the present invention.

Also, it will be described schematically with respect to rendering that is performed by a video processor unit of the present invention. Rendering is one of techniques generating an image. For example, rendering may be used to generate a realistic graphic image by expressing a three-dimensional texture, such as a change of a color and density.

"Real-time" rendering is about making images rapidly on a computer and one of areas where interactivities between users are most active at the computer graphics. The speed of displaying an image may be measured by FPS (frames per second), and it may be said real-time rendering in case that the image is displayed at the speed of more than 15 FPS. Conversely, in case of more than 75 FPS, since users hardly feel any difference in the speed, there is no need to increase the image display speed.

Main purposes of real-time rendering are to 1) make the visual appearance of an object good, and 2) generate and display an image of the object that a user can have a proper interactivity. For this, various techniques may be used. Particularly, 2) may be embodied by acceleration algorithm For example, real-time rendering uses a technique defining a material and light to make a visual appearance good and improving the screen quality through anti-aliasing, gamma-correction, advance lighting, shading, and the like.

Also, real-time rendering may use texturing as acceleration algorithm. The texturing is performed in a manner of covering an image to the surface of an object. Another example of acceleration algorithm is used in culling and pipeline optimization techniques.

Also, the image resource loading method according to the present invention is also one of acceleration algorithms in an aspect of providing a natural image to a user while optimizing loading of image resource data (object), thereby increasing a rendering speed While it has been schematically described above with respect to rendering, techniques that may be used in rendering are not limited thereto. That is, the image resource loading system according to the present invention may perform rendering by using conventional rendering techniques and all newly developed rendering techniques. In this case, it is of course that all belong to the scope of the present invention.

Now, various rendering techniques are being studied to perform rendering "while preventing unreasonable load to a rendering system, at a speed such that a user can have a good interactivity of a good quality image." In case that the conditions as described above complement each other, a proper technique may be selected by a system designer in accordance with the purpose of a system or specification or environment thereof.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

As used in this application, the term "unit" is intended to refer to, but is not limited to, a software or hardware component, which performs certain tasks. A unit or component may advantageously be configured to reside on the addressable storage medium and configured to execute on one or more processors. Thus, a unit or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mane "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

According to the present invention, there are provided image resource loading system and method, which give a comparatively higher loading order to an object of which image is required to be first realized, thereby capable of loading and rendering the object to the optimization.

Also, according to the present invention, there are provided image resource loading system and method, which measure the volume of an object that occupies a cell and is a target for loading and give a loading order to the object in accordance with the measured size of the volume, thereby preferentially loading an object having a more amount of data to be processed.

Also, according to the present invention, there are provided image resource loading system and method, which determine the range of the visual field by using a visual angle at a view point, and preferentially give a comparatively higher loading order to an object positioned in the range of the visual field, thereby preferentially loading an object having a higher need of rendering.

Also, according to the present invention, there are provided image resource loading system and method, which preferentially load a not-occluded object prior to an occluded object in the visual field of a player character.

Also, according to the present invention, there are provided image resource loading system and method, which measure the surface screen area of an object exposed to the visual field of a player character and preferentially load an object of which the screen area is larger.

What is claimed is:

1. An image resource loading system to load an object to update a game display, the system comprising:
    a recording space to partition a game map into at least one cell, and to record a position of an object associated with the at least one cell;
    a loading target identification unit to identify a first cell as a target for loading and to identify objects and a first object among the identified objects associated with the first cell;
    an order determination unit to assign a loading order to the first object according to a first determination criterion, wherein first determination criterion comprises the screen area of the first object at a view point along an eye direction of the player character, wherein the screen area of the first object is determined to be an area of the first object excluding areas partially occluded by the other identified objects at the view point along the eye direction of the player character; and
    a processor unit to load the first object according to the loading order.

2. The system of claim 1, wherein the order determination unit computes an evaluation point with respect to the first object and assigns the loading order to the first object on the basis of the computed evaluation point.

3. The system of claim 1, wherein the first object is positioned within the range of the visual field of a player character.

4. An image resource loading system to load an object to update a game display, the system comprising:
    a recording space to partition a game map into at least one cell, and to record a position of an object associated with the at least one cell;
    a loading target identification unit to identify a first cell as a target for loading and to identify objects and a first object among the identified objects associated with the first cell;
    an order determination unit to assign a loading order to the first object according to a first determination criterion, wherein the first determination criterion comprises the screen area of the first object at a view point along an eye direction of the player character, wherein the screen area of the first object is determined to be an area of the first object excluding areas partially occluded by the other identified objects at the view point along the eye direction of the player character, and at least one second determination criterion, and wherein the second determination criterion comprises selection from the group consisting of the size of the first object compared to the size of the other identified objects; and a processor unit to load the first object according to the loading order.

5. An image resource loading method for loading an object to update a game screen, the method comprising:

maintaining a basic recording space to partition a game map into at least one cell, and to record a position of an object associated with the at least one cell;

identifying a first cell as a target for loading and identifying objects and a first object among the identified objects associated with the first cell;

assigning a loading order to the first object on the basis of a first determination criterion, wherein the first determination criterion comprises the screen area of the first object at a view point according to an eye direction of the player character, wherein the screen area of the first object is determined to be an area of the first object excluding areas partially occluded by the other identified objects at the view point according to the eye direction of the player character; and sequentially loading the first object according to the loading order.

6. The method of claim 5, wherein the first object is positioned within the range of the visual field of a player character.

7. The method of claim 5, wherein identifying the first object associated with the first cell comprises:

determination to load a second cell on the basis of a change in location in response to a determination that a location of the player character changes on the game map; and generating a loading event associated with the changed location of the player character.

8. The method of claim 5, wherein assigning a loading order to the first object comprises:

measuring the volume of the first object; and assigning a loading order to the first object according to the measured volume.

9. The method of claim 5, wherein assigning a loading order to the first object comprises:

determining a view point of the player character on the basis of a location of the player character on the game map;

determining the range of the visual field on the basis of the view point, a movement direction of the player character, and information about the faculty of sight of the player character; and assigning a higher loading order to the first object which is positioned within the range of the visual field than the loading order of an object positioned out of the range of the visual field.

10. The method of claim 5, wherein assigning a loading order to the first object comprises:

determining a view point of the player character on the basis of a location of the player character on the game map;

identifying an eye direction of the player character at the view point;

measuring the surface area of the first object which is exposed at the view point on the basis of the eye direction, to compute a display area; and assigning a loading order to the first object according to the display area.

11. An image resource loading method for loading an object to update a game screen, the method comprising:

maintaining a recording space to partition a game map into at least one cell, and to record a position of an object associated with the at least one cell;

identifying a first cell as a target for loading and identifying objects and a first object among the identified objects associated with the first cell;

assigning a loading order to the first object according to a first determination criterion, wherein the first determination criterion comprises the screen area of the first object at a view point according to an eye direction of the player character, wherein the screen area of the first object is determined to be an area of the first object excluding areas partially occluded by the other identified objects at the view point along the eye direction of the player character, and at least one second determination criterion, and wherein the second determination criterion comprises selection from the group consisting of the size of the first object compared to the size of the other identified objects; and sequentially loading the first object according to the loading order.

* * * * *